United States Patent [19]
Osaki et al.

[11] Patent Number: 5,631,791
[45] Date of Patent: May 20, 1997

[54] DISK CARTRIDGE AND METHOD OF PRODUCING THE SAME

[75] Inventors: Masayuki Osaki; Akira Nonomura; Hiromichi Kimbara, all of Tochigi, Japan

[73] Assignee: Kao Corporation, Tokyo, Japan

[21] Appl. No.: 392,154

[22] Filed: Feb. 22, 1995

[30] Foreign Application Priority Data

Feb. 22, 1994 [JP] Japan .................................. 6-046554

[51] Int. Cl.$^6$ .................... G11B 23/02; G11B 23/03; G11B 7/26
[52] U.S. Cl. .................... 360/133; 360/132; 369/291
[58] Field of Search .................... 360/132, 133; 369/291; 264/328.16, 328.12, 328.8

[56] References Cited

U.S. PATENT DOCUMENTS

| | | | |
|---|---|---|---|
| 5,151,894 | 9/1992 | Fujita | 360/133 |
| 5,161,081 | 11/1992 | Machida et al. | 369/291 |
| 5,327,314 | 7/1994 | KiKuchi et al. | 360/133 |
| 5,398,147 | 3/1995 | Johanson | 360/132 |

FOREIGN PATENT DOCUMENTS 1-217780   8/1989   Japan .

*Primary Examiner*—Stuart S. Levy
*Assistant Examiner*—Adriana Giordana
*Attorney, Agent, or Firm*—Oblon, Spivak, McClelland, Maier & Neustadt, P.C.

[57] ABSTRACT

In a disk cartridge having an imbalance of the flow of resin at the time of injection molding due to the lateral asymmetry of recesses on which a shutter slides, the thickness of each shell of the disk cartridge is balanced laterally by forming a projection in one region which is the left half of the shell or the right half of the shell with respect to the center line C of the shell and occupies a larger part of the area of a shutter sliding recess and by forming a recess in the other region which occupies a smaller part of the area of the shutter recess.

11 Claims, 16 Drawing Sheets

DISK CARTRIDGE AND METHOD OF PRODUCING THE SAME

BACKGROUND OF THE INVENTION

1. Field of the Invention

The present invention relates to a disk cartridge and a method of producing the same.

2. Description of the Related Art

A disk cartridge serves to store and protect a rotating disclike recording medium such as a magnetic disk, an optical disk, an opto-magnetic disk, or the like. The disk cartridge is constituted by upper and lower quadrangular shells in which a recording medium is rotatably disposed. A write/read window is formed in the upper and lower shells, and a head for writing or reading a recording medium signal (or write/read light) may be inserted through the window. This window is opened/closed by a slidable shutter made of a metal or resin. Sunken portions are formed in the respective upper and lower shells in an area over which this shutter slides. However, the thickness of the shells is not symmetric with respect to a center line passing through the write/read window and the rotation center of the rotary recording medium because the range of sliding of the shutter is located so as to be one-sided with respect to this center line.

FIG. 14 is an exploded perspective view of a flexible disk cartridge (hereinafter abbreviated to "FDC") of a 3.5-inch size.

FIG. 15A is a plan view of the upper shell of the FDC depicted in FIG. 14 when viewed from the inside thereof, and FIG. 15B is a sectional end view taken along the line 15B—15B. FIG. 16A is a plan view of the lower shell of the FDC depicted in FIG. 14 when viewed from the inside thereof, and FIG. 16B is a sectional end view taken along the line 16B—16B.

In these drawings, the thickness is exaggerated for convenience of construction of the drawings and for simplification thereof. This rule is also applied to the drawings showing embodiments of the present invention which will be described later.

The FDC comprises upper and lower quadrangular shells 1a and 1b made of a synthetic resin, and a shutter 3 made of a metal or resin. The upper and lower shells 1a and 1b have low walls at their peripheries. The upper shell 1a and the lower shell 1b are fixed to each other at four corners by ultrasonic welding or any other means. A magnetic disk 2 as a recording medium is rotatably disposed inside of these shells 1a and 1b.

The magnetic disk 2 is constituted by a rotation support 11 made of metal, and a doughnut-shaped sheet 13 attached to the support 11 and coated with a magnetic substance. A circular holding wall 10 and a circular hole 12 are formed in the center portion of the inner surface of the upper shell 1a and in the center portion of the lower shell 1b, respectively. The support 11 is loosely and rotatably fitted to the holding wall 10 and circular hole 12 so that the support 11 is positioned in the FDC. A hole 14 for chucking the magnetic disk 2 to a spindle of a flexible disk drive device (FDD) is formed in the support 11. Bulkheads 18a and 18b for guiding the peripheral edge of the magnetic disk 2 are formed in the inner surfaces of the upper and lower shells 1a and 1b, respectively.

Liners (not shown) made of nonwoven fabric or the like are stuck to the respective inner surfaces of the upper and lower shells 1a and 1b in order to prevent dust or the like from being deposited on the rotating magnetic disk 2 and to prevent the magnetic disk 2 from being damaged because of direct contact with the inner surfaces of the shells. Ribs 8a and 8b for supporting a cleaner (not shown) are formed on the insides of the upper and lower shells 1a and 1b, respectively.

A hole 9 for slidably attaching a write-protect tab (not shown) is formed at one corner of the lower shell 1b. A hole 16 for indicating the kind of the FDC is formed at another corner of the lower shell 1b. The holes 9 and 16 are surrounded by partition walls 17, respectively, in order to prevent dust or the like from entering into the FDC through these holes.

Write/read windows 4a and 4b through which a magnetic head (not shown) comes to write data into the magnetic disk 2 or to read data from the magnetic disk 2 are formed in one-side portion of each of the upper and lower shells 1a and 1b, respectively. A shutter 3 is provided to open/close the windows 4a and 4b. Sunken portions or recesses 5a and 5b are formed in the respective outer surfaces of the upper and lower shells 1a and 1b in a range in which the shutter 3 slides. The depth of each of the recesses 5a and 5b is substantially equal to the thickness of a constituent member of the shutter 3. In addition, recesses 7a and 7b for sticking a label or the like, arrows 18 for indicating the direction of insertion of the FDC, and so on, are formed in the outer surfaces of the upper and lower shells 1a and 1b.

The shutter 3 is composed of two shielding portions along the recesses of the upper and lower shells 1a and 1b, and a portion for connecting the shielding portions to each other. The shutter 3 is slidably attached onto the recesses 5a and 5b so that the upper and lower shells 1a and 1b are sandwiched by the shutter 3. Oblong windows 15a and 15b slightly larger than the write/read windows 4a and 4b are formed in the shielding portions of the shutter 3. The shutter 3 is normally urged toward one end of the recesses 5a and 5b by a spring (not shown) so that the windows 4a and 4b are closed by the shielding portions. When the FDC is inserted into the FDD, the shutter 3 is moved toward the other end of the recesses 5a and 5b by a shutter releasing mechanism in the FDD so that the windows 15a and 15b are made coincident with the windows 4a and 4b to thereby open the windows 4a and 4b.

Generally, the upper and lower shells 1a and 1b are formed by an injection molding method. Traces 6 of gates marked at the time of injection molding remain in the recesses 5a and 5b. Generally, gates for injecting molten resin are provided in unobstructive places, for example, at two points in the recesses 5a and 5b or at two points in the recesses 7a and 7b which are provided for sticking a label. Alternatively, gates may be provided at four points both in the recesses 5a and 5b and in the recesses 7a and 7b.

The windows 4a and 4b are formed in the upper and lower shells 1a and 1b in the lateral center positions, respectively. Assume now a center line C of the upper and lower shells 1a and 1b which passes through the center of the holding wall 10 or circular hole 12 and the center of the windows 4a and 4b. In the upper shell 1a depicted in FIGS. 15A and 15B, the recess 5a is located more in the left-sided position with respect to the center line C so that the thicker portion in the right side is wider than the thicker portion in the left side. In the lower shell 1b depicted in FIGS. 16A and 16B, the recess 5b is located more in the right-sided position so as to be eccentric with respect to the center line C, so that the thick portion in the left side is wider than the thick portion in the right side. Thus, the upper and lower shells 1a and 1b are not symmetric laterally with respect to the center line C because of the presence of the recesses 5a and 5b limiting the range of sliding of the shutter 3.

In molds for injection-molding these shells, there is a problem that a flow of resin coming into a cavity at the time of injection molding becomes unbalanced because of the lateral asymmetry in thickness of the shells. The imbalance of the flow of resin results in a weld line, formed when molten resins are merged and fused into one at the time of molding, not being located in the vicinity of the center line of the shells but located greatly eccentrically to the left or right.

FIGS. 17 and 18 show results of simulation of the flow of resin in a cavity in the case where molten resin is injected into the cavity through two gates 6, with respect to the conventional upper and lower shells, respectively. A larger amount of resin comes into the cavity from the thicker side where the flow resistance is small. It is apparent that the weld line WL is located greatly one-sided to the left in the case of the upper shell 1a and to the right in the case of the lower shell 1b.

Thus, there arises a phenomenon that the flow length of resin coming in through one gate is larger than the flow length of resin coming in through the other gate. As a result, the risk of a failure of complete filling with resin is heightened. Furthermore, there is a possibility that the molded shells may warp because of differences in packing density between the left and right resins.

The aforementioned problem can be solved if the thickness of the shells is made laterally symmetrical. It is however impossible to change the size of the slide portion of the shutter because the size is prescribed by JIS X6221 (equivalent to ISO 8860-1) or JIS X6223 (equivalent to ISO 9529-1).

There has been a proposal in which each shell is differentiated in thickness to provide a portion of resistance against the flow of resin to thereby control the flow of resin (Japanese Patent Unexamined Publication No. Hei-1-217780). This proposal is such that a portion of resistance against the flow of resin is provided in the vicinity of a resin filling end portion in order to solve the failure in which the flow of resin in the vicinity of a filling end portion goes round from the vicinity of the outer wall portion of a product to cause instability in thickness of this surrounded portion or formation of a hole. However, this proposal is not intended to control the overall filling of the shells with resin and not intended to solve the lateral imbalance of the filling with resin due to the presence of the recesses limiting the range of sliding of the shutter.

SUMMARY OF THE INVENTION

The present invention is intended to provide a disk cartridge having such a shape that imbalance of a flow of resin caused by lateral asymmetry in thickness of a shutter sliding portion is eliminated, so that there is no inclination or little inclination of the flow of resin at the time of injection molding, and to provide a method of producing such a disk cartridge.

In order to achieve the above object, the present invention provides a disk cartridge constituted by upper and lower shells for rotatably storing a rotary recording medium, the shells being provided with shutter recesses which are formed in outer surfaces of the shells respectively so that a slidable shutter for opening and closing write/read windows formed respectively in the shells is placed on the shutter recesses, the shutter recesses being located so as to be offset from a lateral center line of the shells. In at least one of the upper and lower shells, a projection for making the thickness of the shell symmetric is formed in one of regions of left and right halves of the shell with respect to the center line where the shutter recess occupies a larger area than that in the other half region and or a recess for making the thickness of the shell symmetric is formed in the other half region where the shutter recess occupies a smaller area than that in the one half area.

Generally, aforementioned projection or recess is formed in the inner surface of said shell.

According to an embodiment of the present invention, the aforementioned projection or recess is provided in a part of a region corresponding to the aforementioned shutter recess or in the vicinity thereof.

According to another embodiment of the present invention, the aforementioned projection is formed all over a region of the inner surface of the shell corresponding to the shutter recess.

According to a further embodiment of the present invention, the aforementioned recess is formed in at least one region other than a region of the inner surface of the shell corresponding to the shutter recess.

A center hole through which a spindle of a motor for rotating the rotary recording medium is inserted is provided in one of the upper and lower shells. The presence of the center hole tends to cause imbalance of resin to be packed. It is therefore preferable that the aforementioned projection or recess is formed in the shell having the center hole for rotating the rotary recording medium.

According to the present invention, in a method of producing a disk cartridge, a shell of a disk cartridge is produced by injection molding with use of a mold in which a cavity having a shape corresponding to the shape of the aforementioned shell is formed and in which gates are provided laterally symmetrically in the position of the aforementioned shutter recess.

According to the present invention, the offset of thickness due to the shutter recess formed in the shell constituting the disk cartridge is compensated for by forming a projection or a recess in the shell to thereby eliminate the lateral asymmetry of thickness. Accordingly, resin injected through left and right gates to produce the shell by injection molding is packed up to an end of the cavity with good lateral balance, so that the quality of products can be improved. That is, failures such as formation of a hole caused by insufficient filling with resin and failures such as bending of shells caused by difference in packing density between left and right resins are avoided.

The present invention is not limited to the flexible disk cartridge. The present invention can be applied to other disk cartridges such as an optical disk cartridge, an opto-magnetic disk cartridge, and so on.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
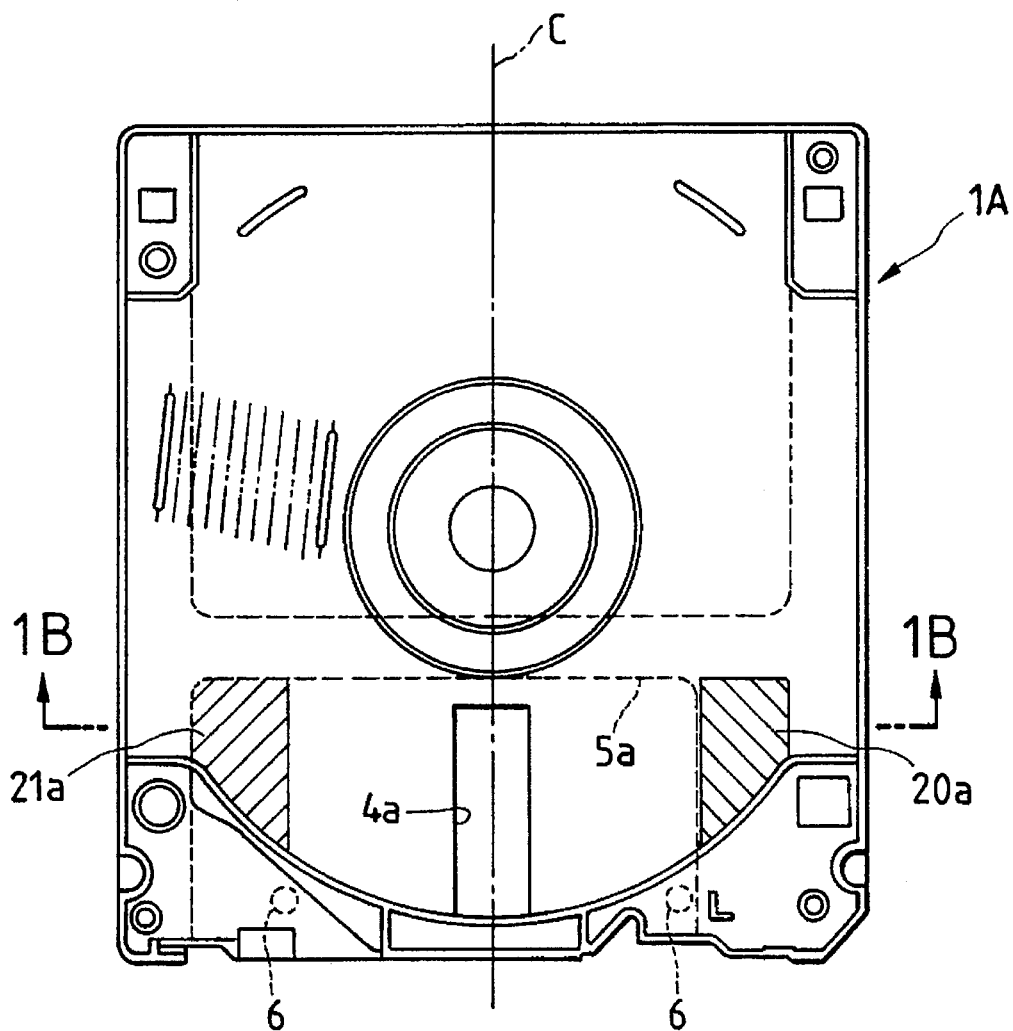
FIG. 1A is a plan view of an upper shell according to a first embodiment of the invention when viewed from the inside thereof.

In FIGS. 1A through 13C for explaining embodiments of the invention, parts which are the same as those in FIGS. 14 through 18 are identified by reference characters the same as those in FIGS. 14 through 18 to avoid duplication of description. The discussion will instead focus on differences from the conventional case.

First Embodiment

Figure 1B:
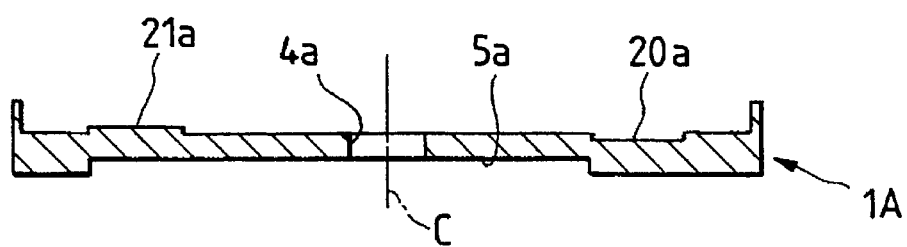
FIG. 1B is a sectional end view taken along the line 1B—1B in FIG. 1A.
Figure 2A:
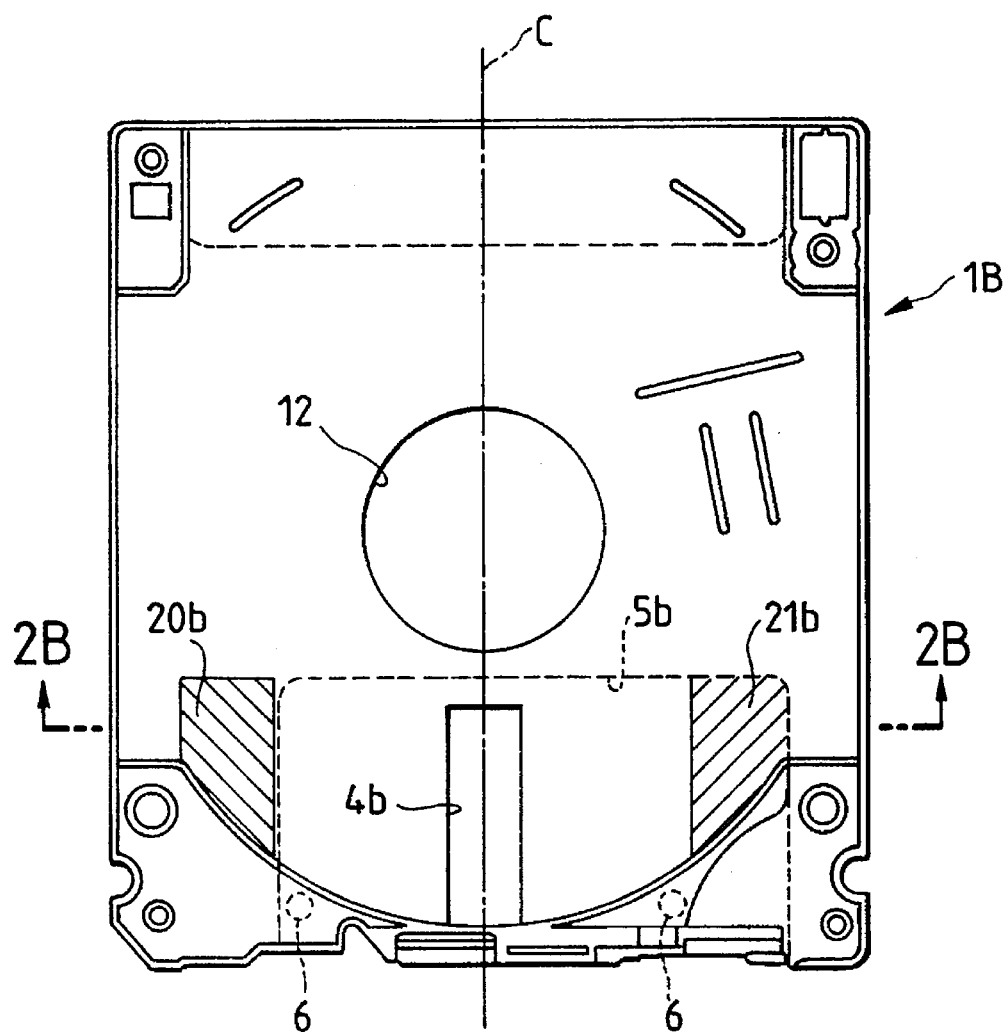
FIG. 2A is a plan view of a lower shell according to the first embodiment of the invention when viewed from the inside thereof.

FIG. 1A is a plan view of an upper shell according to a first embodiment when viewed from the inside thereof; and FIG. 1B is a sectional end view taken along the line 1B—1B in FIG. 1A. FIG. 2A is a plan view of a lower shell according to the first embodiment when viewed from the inside thereof; and FIG. 2B is a sectional end view taken along the line 2B—2B in FIG. 2A.

In the upper and lower shells 1A and 1B, the shape, size and position of the recesses 5a and 5b limiting the range of sliding of the shutter 3 are the same as those in the conventional case.

In the inner surface of the upper shell 1A in FIGS. 1A and 1B, a projection 21a (swollen portion or thick portion) and a recess 20a (thin portion) are formed in a position corresponding to the left portion of the recess 5a and in a position corresponding to the outside of the right portion of the recess 5a, respectively. These projection 21a and recess 20a are represented by hatching in FIG. 1A. The area and height of the projection 21a are equal to the area and depth of the recess 20a. The sizes of the projection 21a and recess 20a are determined so that the volume of the shell 1A portion in the left side with respect to the center line C and the volume in the right side with respect to the center line C are made substantially equal to each other at the recess 5a and its vicinity. As a result, the lateral symmetry in thickness of the upper shell 1A is assured.

Figure 2B:
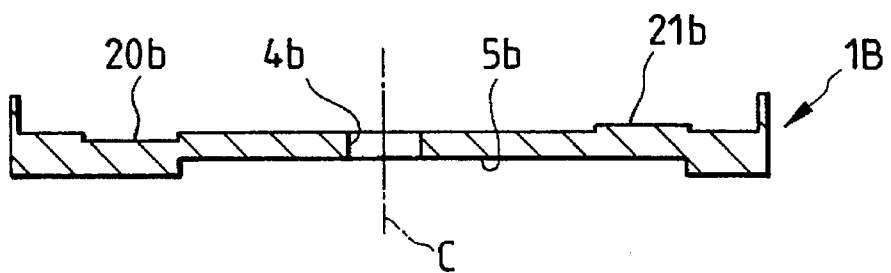
FIG. 2B is a sectional end view taken along the line 2B—2B in FIG. 2A.

In the inner surface of the lower shell 1B in FIGS. 2A and 2B, a recess 20b and a projection 21b are formed in a position corresponding to the outside of the left portion of the recess 5b and in a position corresponding to the right portion of the recess 5b, respectively, in the same manner as described above (the recess 20b and projection 21b being represented by hatching in FIG. 2A). As a result, the lateral symmetry in thickness of the lower shell 1B is assured.

Figure 3:
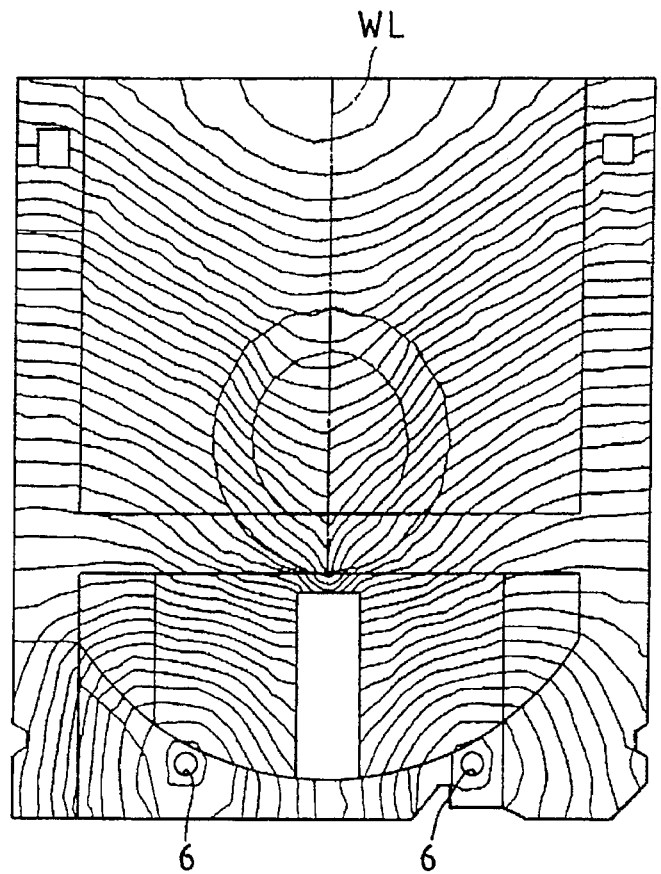
FIG. 3 shows a result of simulation of the flow of resin in the case where molten resin is injected into a cavity of molds through gates to form the upper shell depicted in FIG. 1A.
Figure 4:
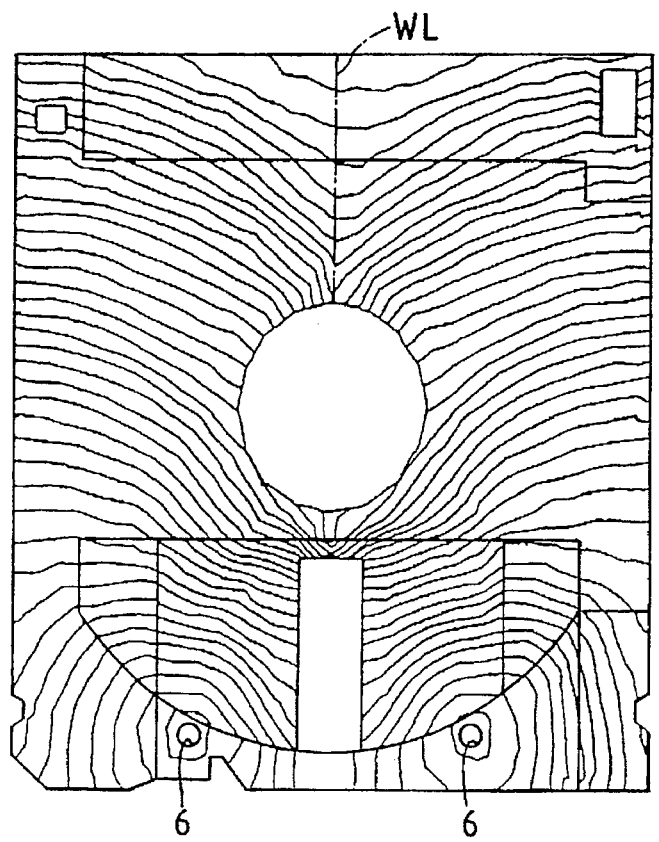
FIG. 4 shows a result of simulation of the flow of resin in the case where molten resin is injected into a cavity of molds through gates to form the lower shell depicted in FIG. 2A.

FIGS. 3 and 4 show results of a simulation of the flow of resin in the case where molten resin is injected into a cavity of molds through two gates, for the upper shell according to the first embodiment and the lower shell according to the first embodiment, respectively.

Because the symmetry in thickness of the upper and lower shells according to the first embodiment is assured, molten resin comes in through the two gates so as to be balanced substantially laterally symmetrically to thereby form a weld line WL substantially on the center line. The balance of the flow of resin in the lower shell is improved greatly, even though the eccentricity of the flow of resin in the conventional lower shell is large because the lower shell has a hole 12 in its center (see FIG. 18).

The projections and recesses are formed in the inner surfaces of the shells but there is no change in the outer surfaces of the shells. There is no change in the sizes of the shutter sliding recesses 5a and 5b decided by JIS X6221 (equivalent to ISO 8860-1) or JIS X6223 (equivalent to ISO 9521-1). Further, because the magnetic disk 2 does not rotate with direct contact with the inner surfaces of the upper and lower shells 1A and 1B, the change in shape of the inner surfaces does not have a bad influence on the magnetic disk.

Second Embodiment

Figure 5A:
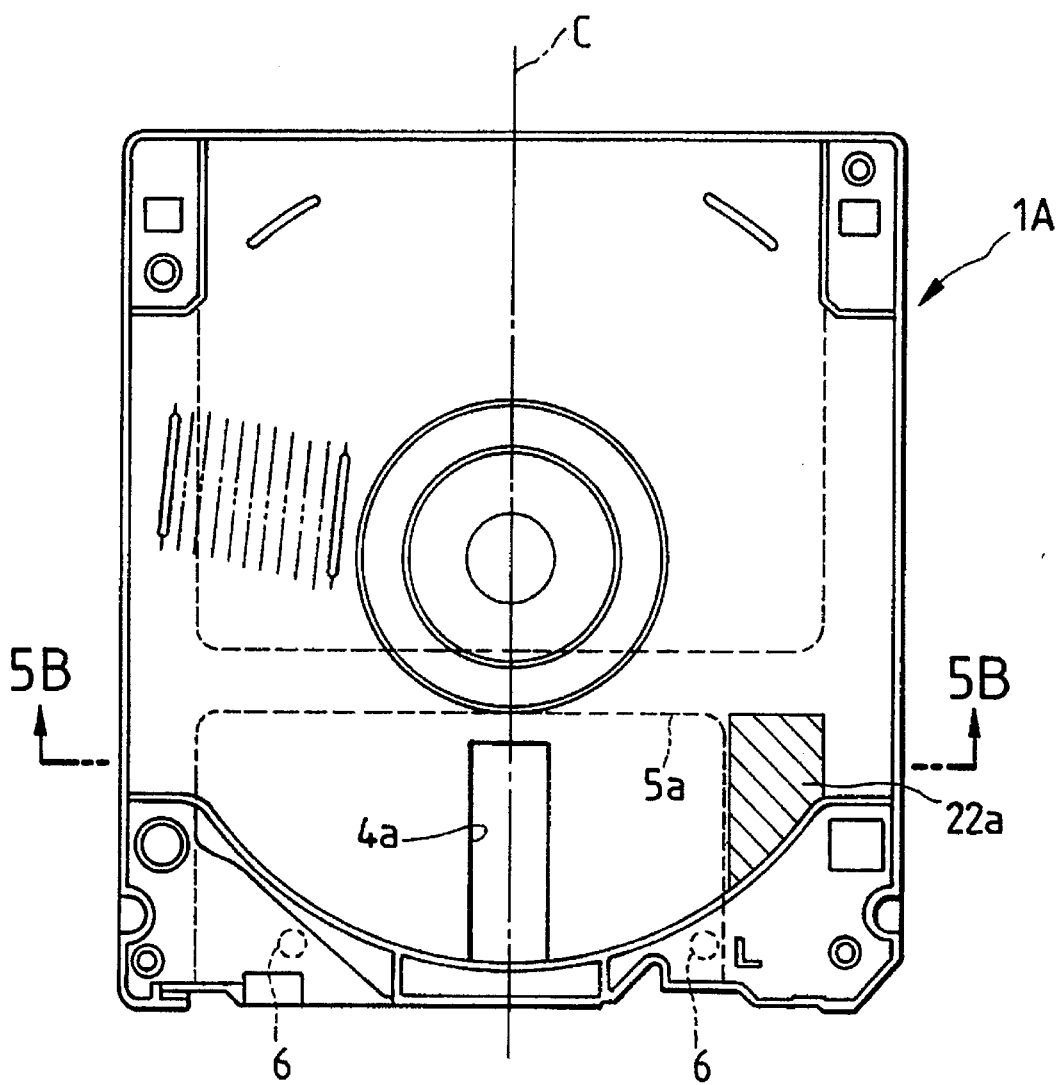
FIG. 5A is a plan view of an upper shell according to a second embodiment of the invention when viewed from the inside thereof.
Figure 5B:
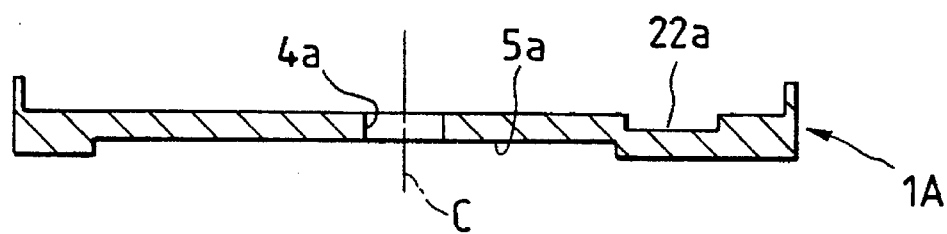
FIG. 5B is a sectional end view taken along the line 5B—5B in FIG. 5A.
Figure 6A:
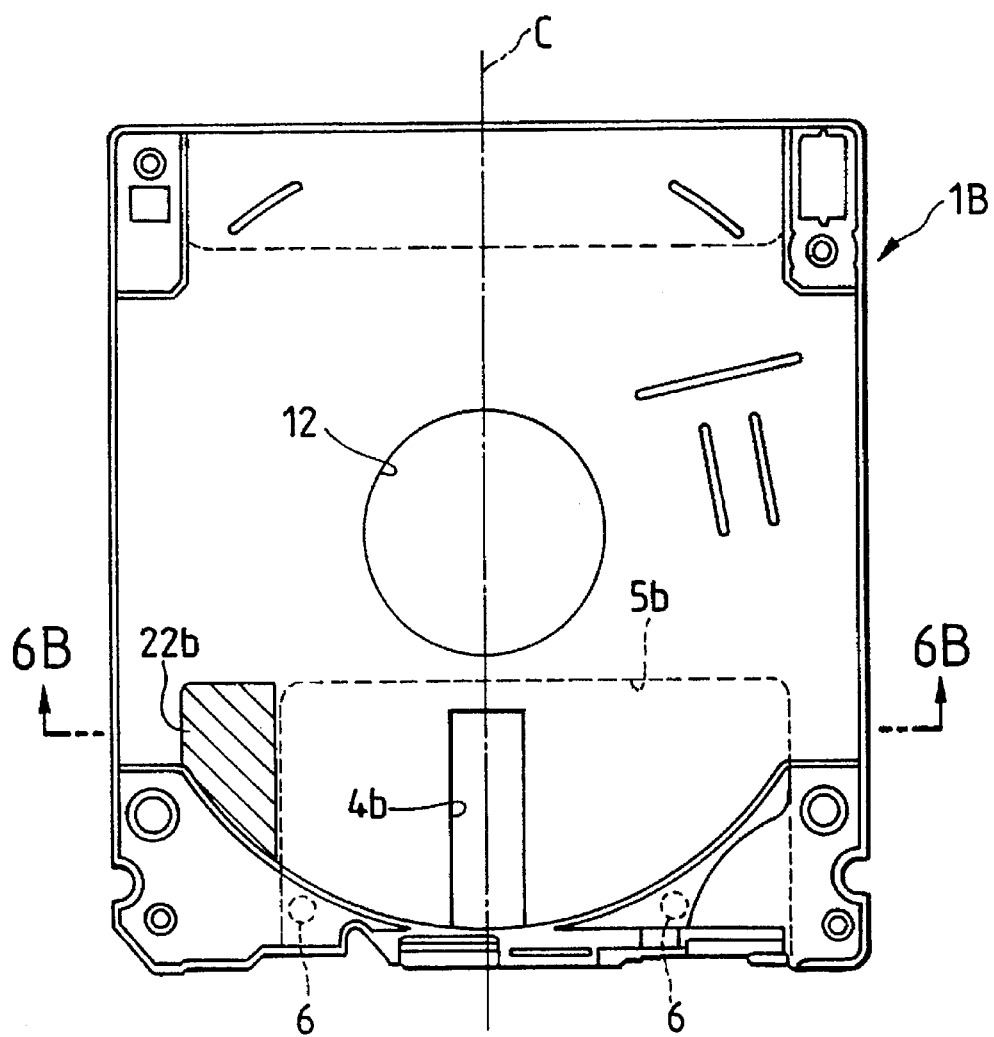
FIG. 6A is a plan view of a lower shell according to the second embodiment of the invention when viewed from the inside thereof.
Figure 6B:
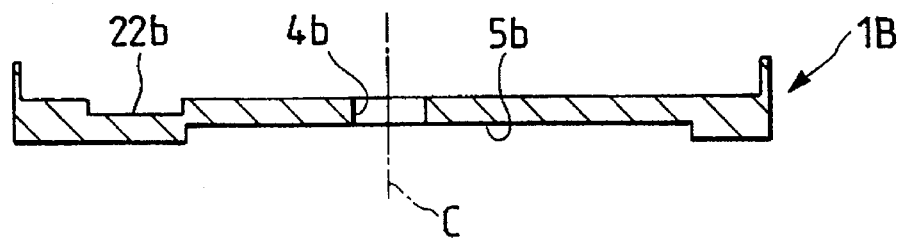
FIG. 6B is a sectional end view taken along the line 6B—6B in FIG. 6A.

FIG. 5A is a plan view of an upper shell according to a second embodiment when viewed from the inside thereof; and FIG. 5B is a sectional end view taken along the line 5B—5B in FIG. 5A. FIG. 6A is a plan view of a lower shell according to the second embodiment when viewed from the inside thereof; and FIG. 6B is a sectional end view taken along the line 6B—6B in FIG. 6A.

A recess 22a (represented by hatching in FIG. 5A) and a recess 22b are formed in a position corresponding to the outside of the right portion of the recess 5a in the inner surface of the upper shell 1A and in a position corresponding to the outside of the left portion of the recess 5b, respectively, to thereby assure lateral symmetry in thickness with respect to the center line C. As a result, the eccentricity of the flow of resin at the time of injection molding is eliminated, so that a weld line is formed substantially on the center line C of the shells.

Third Embodiment

Figure 7A:
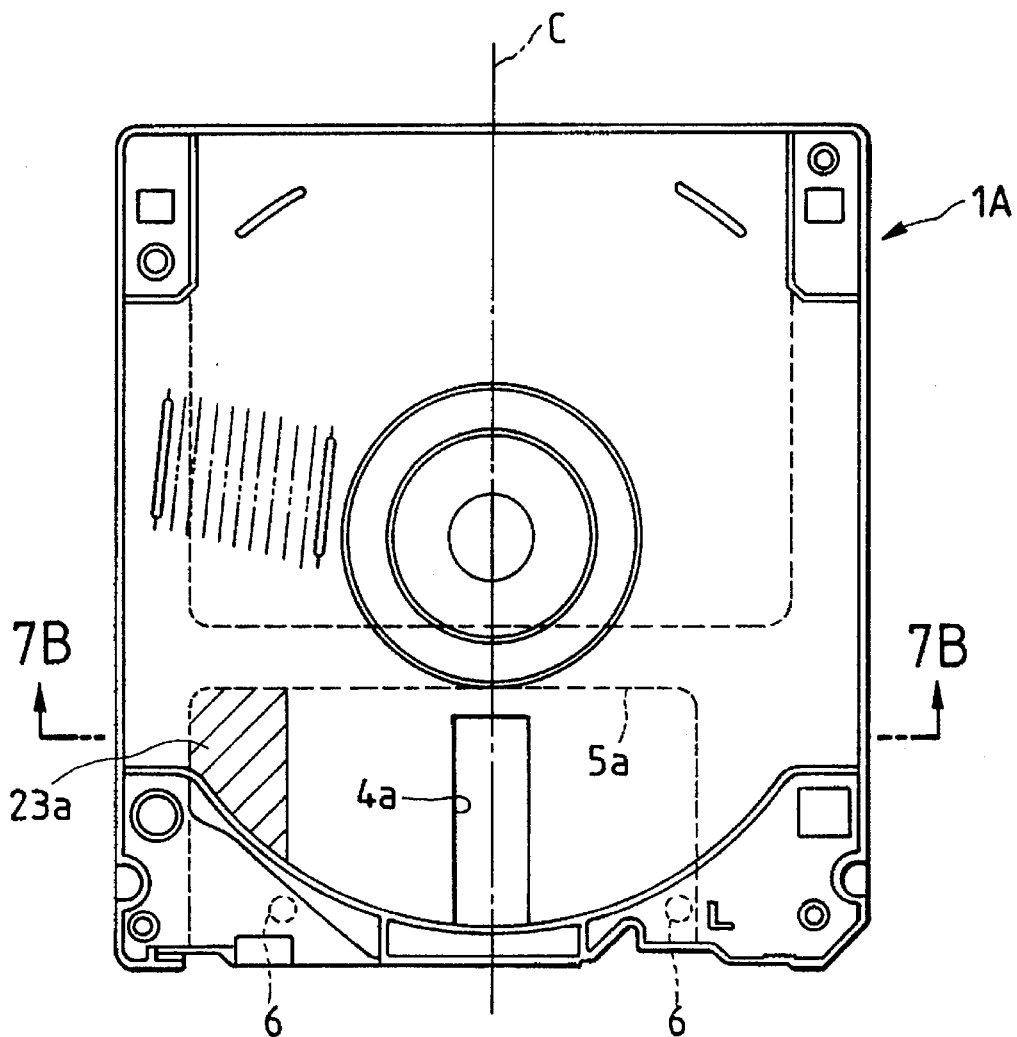
FIG. 7A is a plan view of an upper shell according to a third embodiment of the invention when viewed from the inside thereof.
Figure 7B:
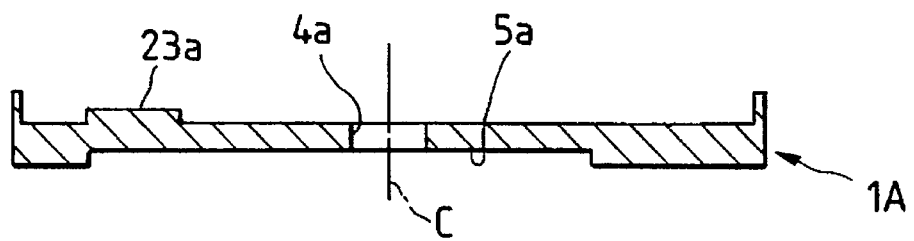
FIG. 7B is a sectional end view taken along the line 7B—7B in FIG. 7A.
Figure 8A:
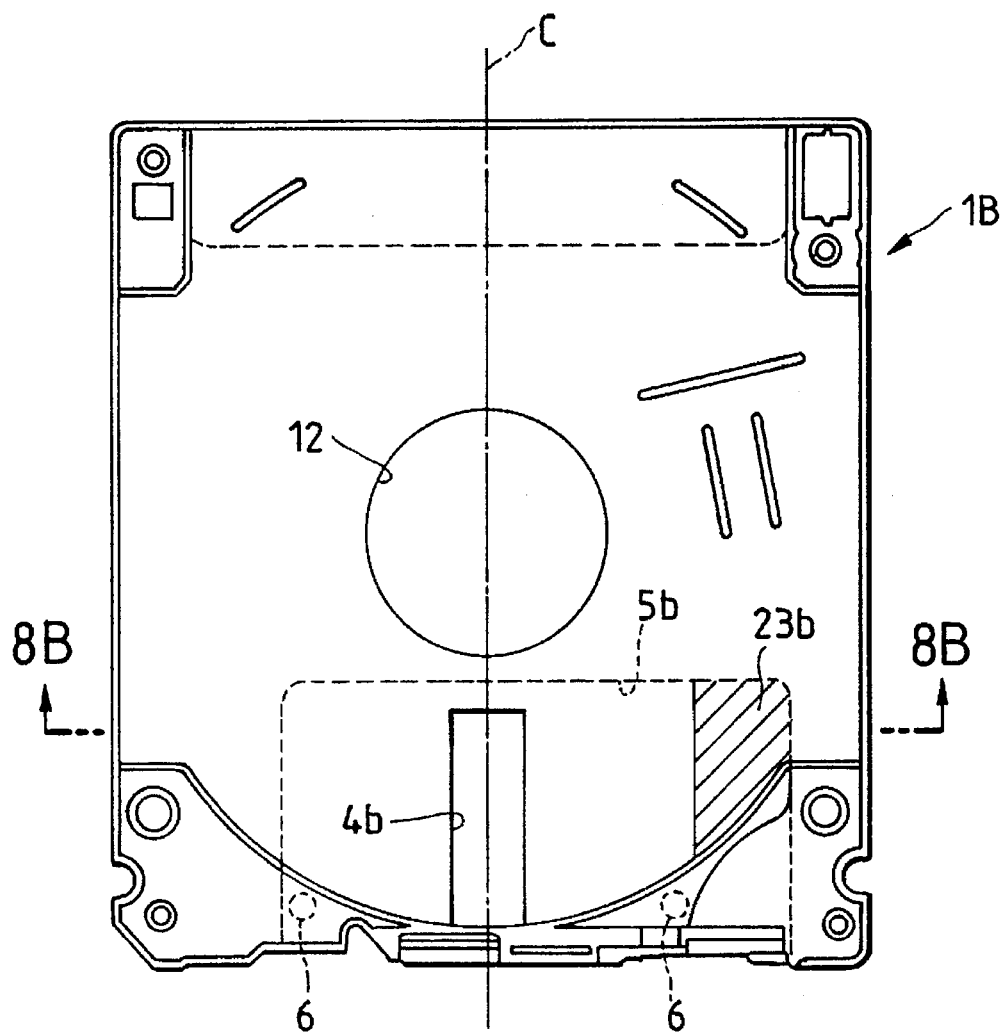
FIG. 8A is a plan view of a lower shell according to the third embodiment of the invention when viewed from the inside thereof.
Figure 8B:
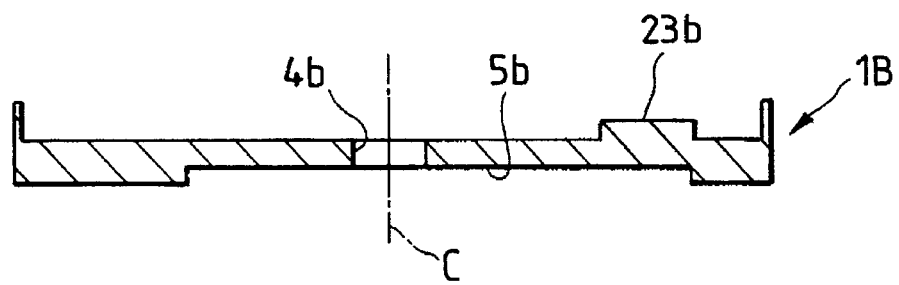
FIG. 8B is a sectional end view taken along the line 8B—8B in FIG. 8A.

FIG. 7A is a plan view of an upper shell according to a third embodiment when viewed from the inside thereof; and FIG. 7B is a sectional end view taken along the line 7B—7B in FIG. 7A. FIG. 8A is a plan view of a lower shell according to the third embodiment when viewed from the inside thereof; and FIG. 8B is a sectional end view taken along the line 8B—8B in FIG. 8A.

A projection 23a and a projection 23b are formed in a position corresponding to the left portion of the recess 5a in the inner surface of the upper shell 1A and in a position corresponding to the right portion of the recess 5b, respectively, to thereby assure lateral symmetry in thickness. By the aforementioned structure, the flow of resin can be balanced laterally.

Fourth Embodiment

Figure 9A:
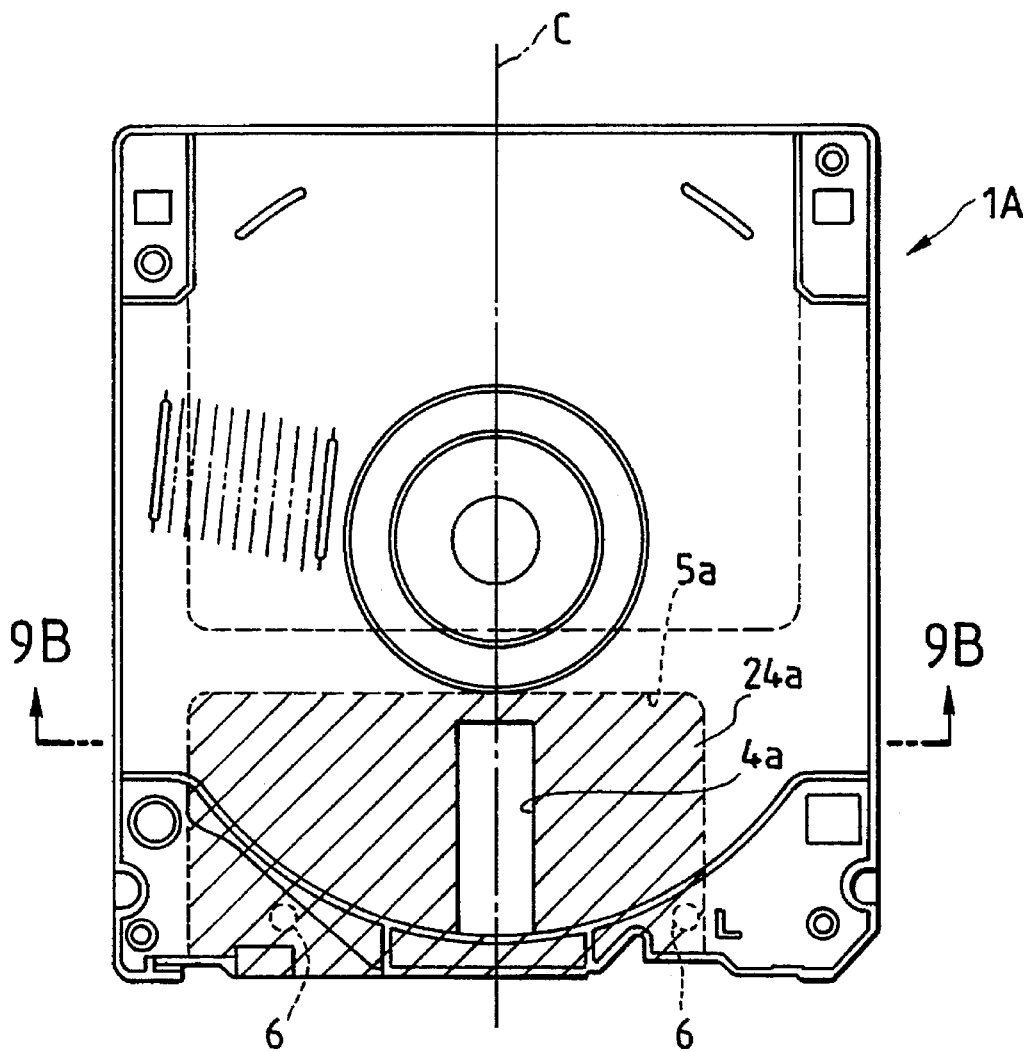
FIG. 9A is a plan view of an upper shell according to a fourth embodiment of the invention when viewed from the inside thereof.
Figure 9B:
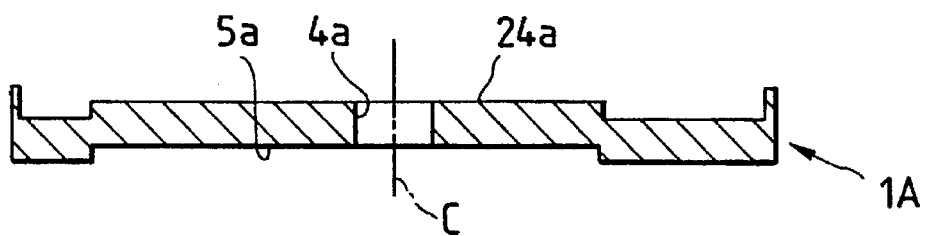
FIG. 9B is a sectional end view taken along the line 9B—9B in FIG. 9A.
Figure 10A:
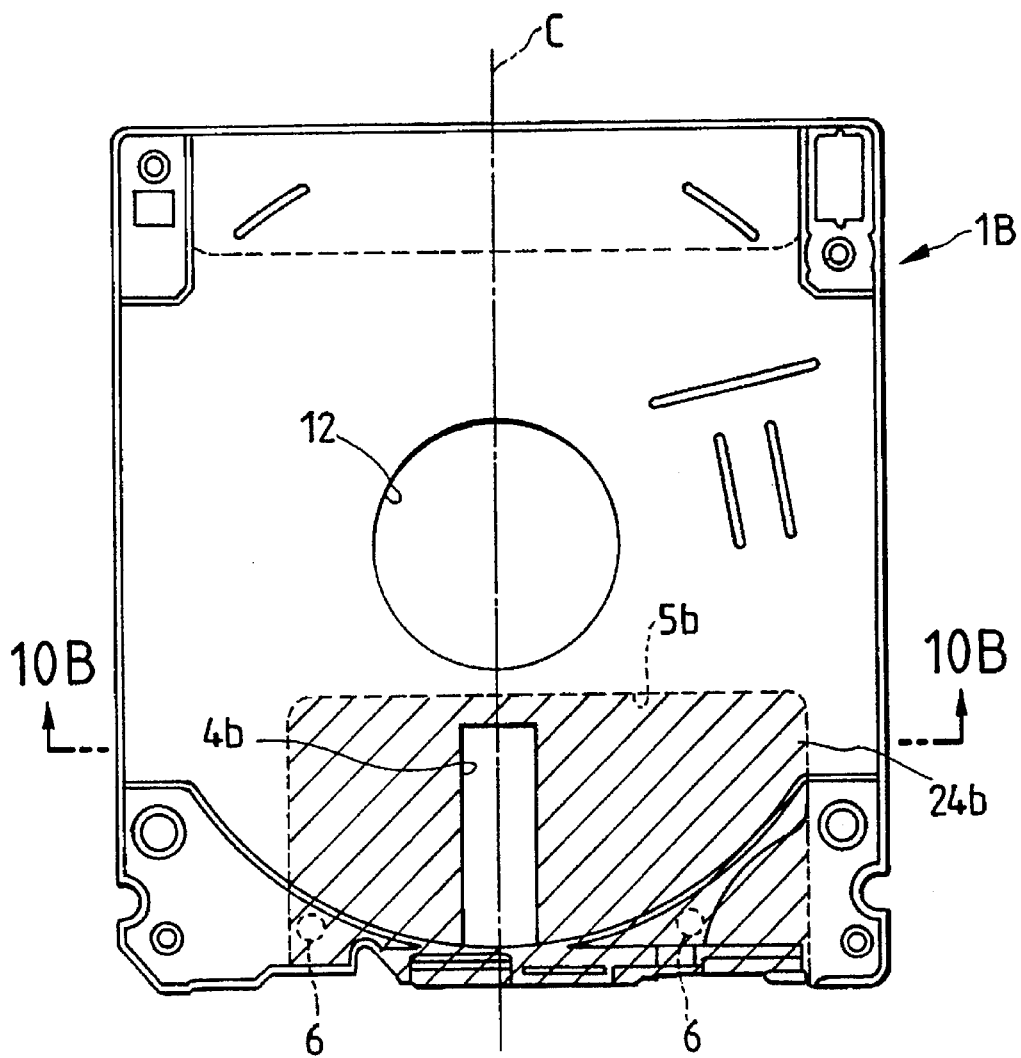
FIG. 10A is a plan view of a lower shell according to the fourth embodiment of the invention when viewed from the inside thereof.
Figure 10B:
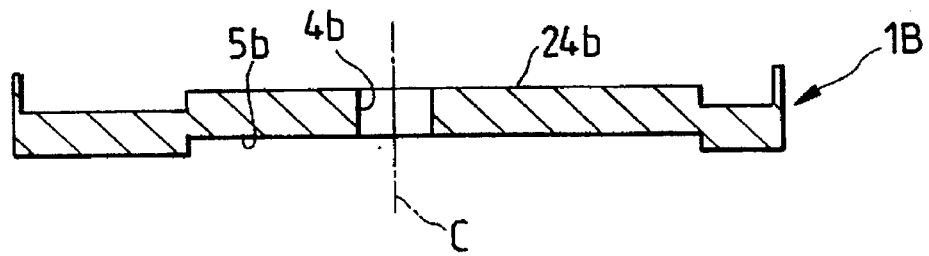
FIG. 10B is a sectional end view taken along the line 10B—10B in FIG. 10A.

FIG. 9A is a plan view of an upper shell according to a fourth embodiment when viewed from the inside thereof; and FIG. 9B is a sectional end view taken along the line 9B—9B in FIG. 9A. FIG. 10A is a plan view of a lower shell according to the fourth embodiment when viewed from the inside thereof; and FIG. 10B is a sectional end view taken along the line 10B—10B in FIG. 10A.

Projections 24a and 24b are formed over regions corresponding to the recesses 5a and 5b in the inner surfaces of the upper and lower shells 1A and 1B, respectively. The thickness of the projections is equal to the thickness of the portions of the upper and lower shells 1A and 1B except the recesses 5a and 5b. As a result, the thickness of the upper and lower shells 1A and 1B is made substantially uniform on the whole, so that the thickness is made laterally symmetric with respect to the center line C.

Fifth Embodiment

The fifth embodiment is intended to make the thickness of the shells uniform as a whole.

Figure 11A:
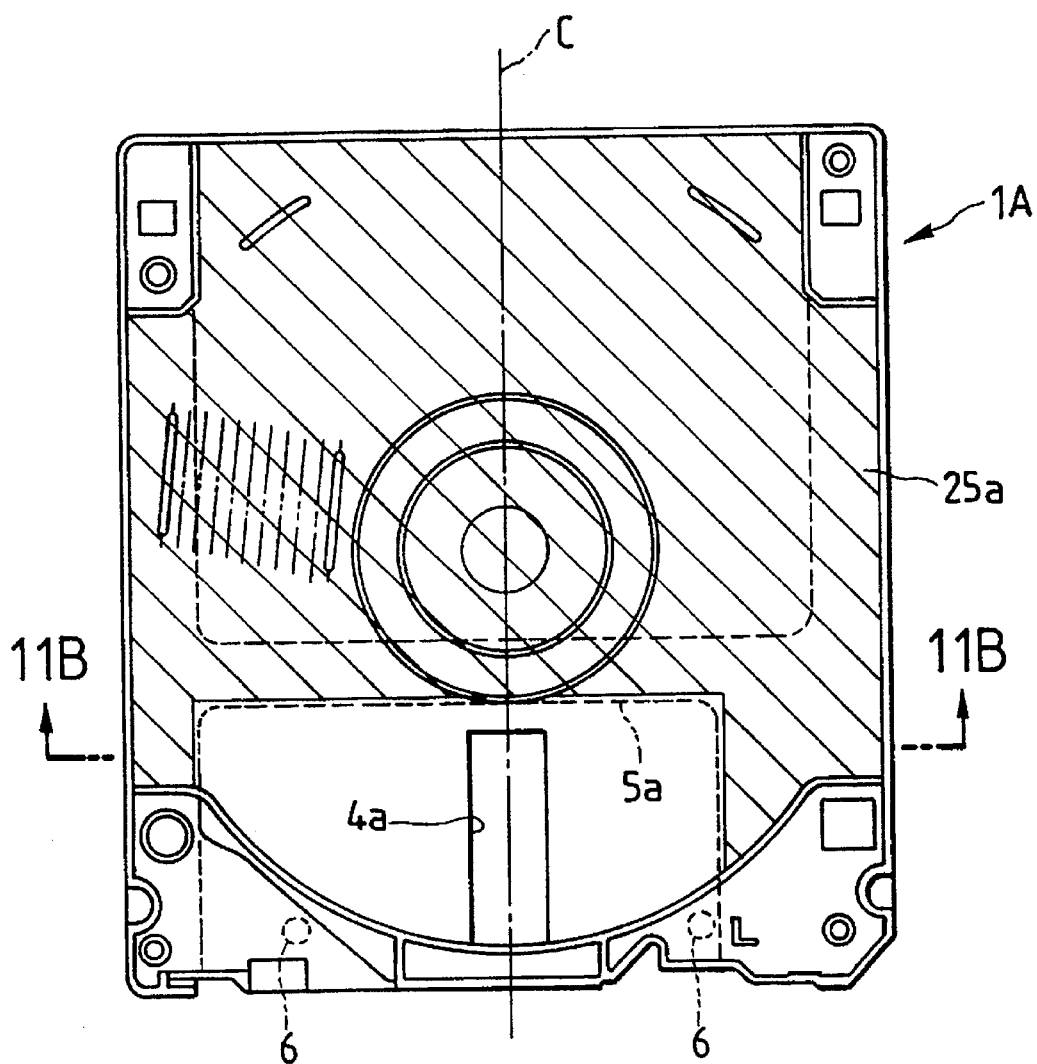
FIG. 11A is a plan view of an upper shell according to a fifth embodiment of the invention when viewed from the inside thereof.
Figure 11B:
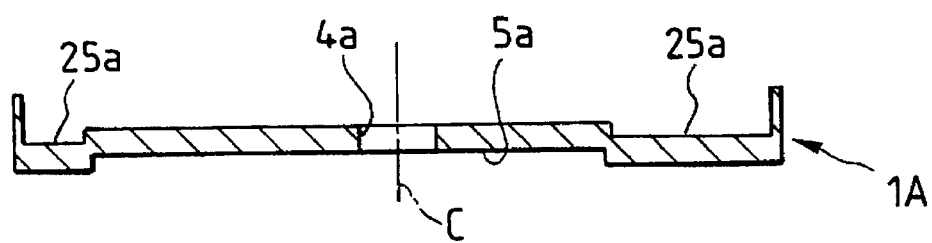
FIG. 11B is a sectional end view taken along the line 11B—11B in FIG. 11A.
Figure 12A:
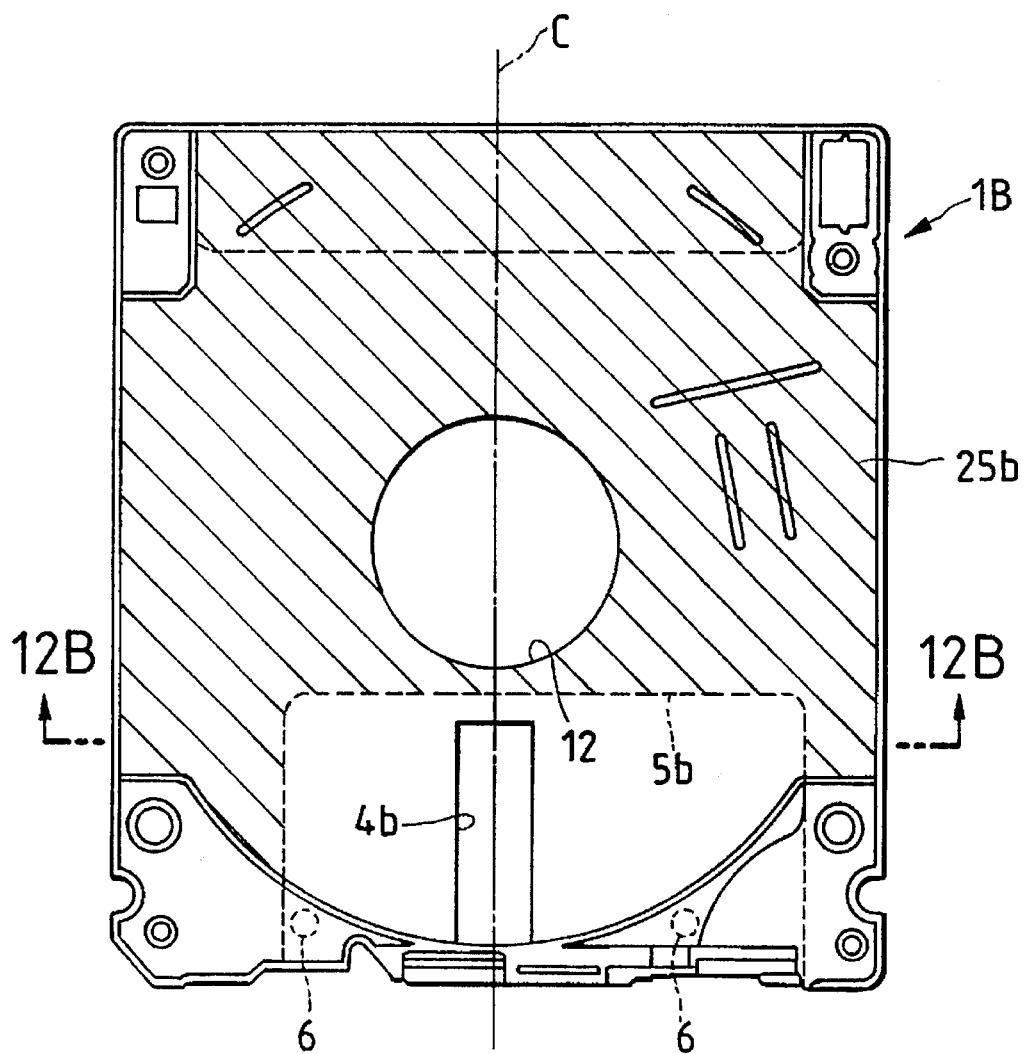
FIG. 12A is a plan view of a lower shell according to the fifth embodiment of the invention when viewed from the inside thereof.
Figure 12B:
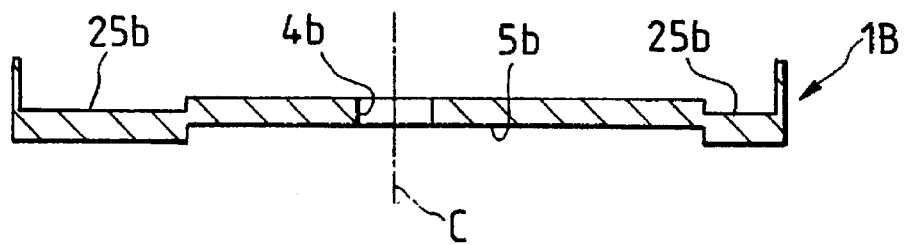
FIG. 12B is a sectional end view taken along the line 12B—12B in FIG. 12A.

FIG. 11A is a plan view of an upper shell according to the fifth embodiment when viewed from the inside thereof; and FIG. 11B is a sectional end view taken along the line 11B—11B in FIG. 11A. FIG. 12A is a plan view of a lower shell according to the fifth embodiment when viewed from the inside thereof; and FIG. 12B is a sectional end view taken along the line 12B—12B in FIG. 12A.

In the inner surfaces of the upper and lower shells 1A and 1B, recesses 25a and 25b are formed in all regions except regions corresponding to the recesses 5a and 5b limiting the range of sliding of the shutter 3. The thickness of the shells 1A and 1B is substantially uniform as a whole.

Sixth Embodiment

Figure 13A:
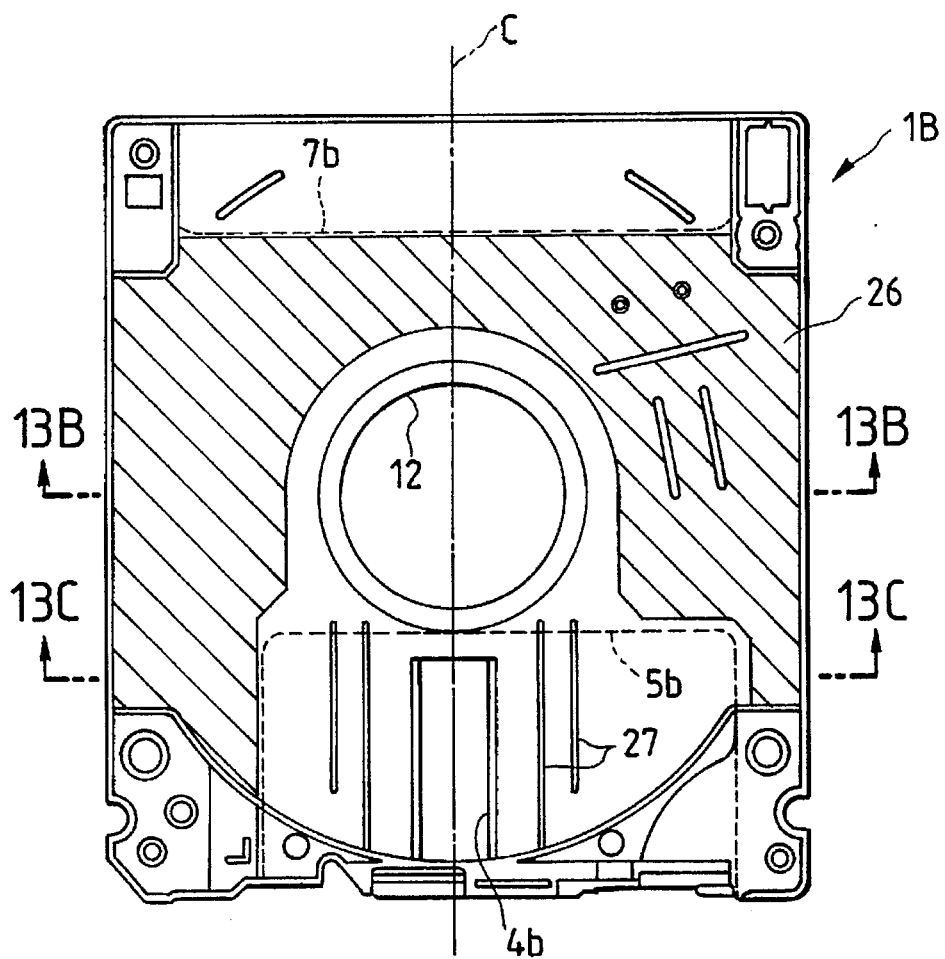
FIG. 13A is a plan view of a lower shell according to a sixth embodiment of the invention when viewed from the inside thereof.
Figure 13B:
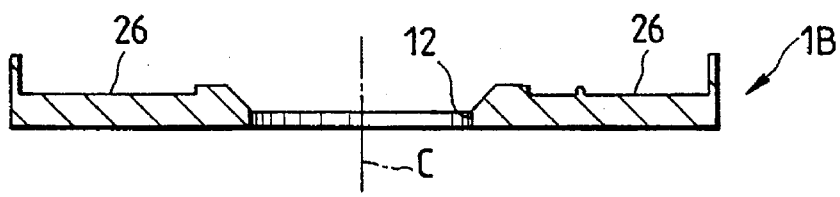
FIG. 13B is a sectional end view taken along the line 13B—13B in FIG. 13A.
Figure 13C:
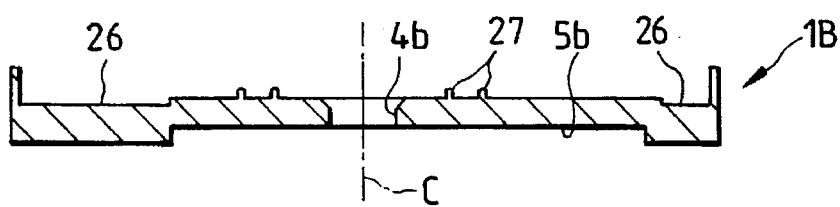
FIG. 13C is a sectional end view taken along the line 13C—13C in FIG. 13A.
Figure 14:
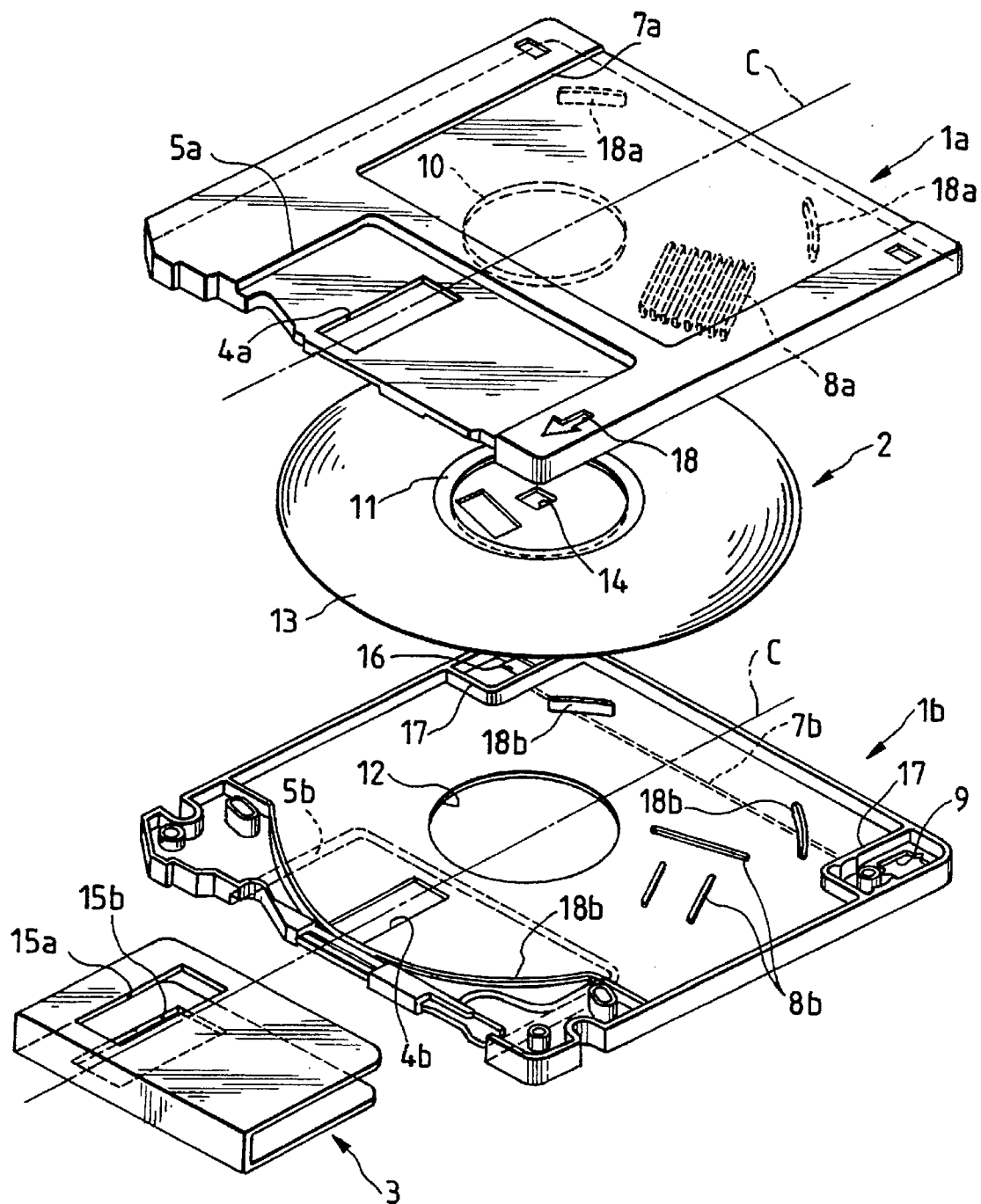
FIG. 14 is an exploded perspective view of a conventional disk cartridge.
Figure 15A:
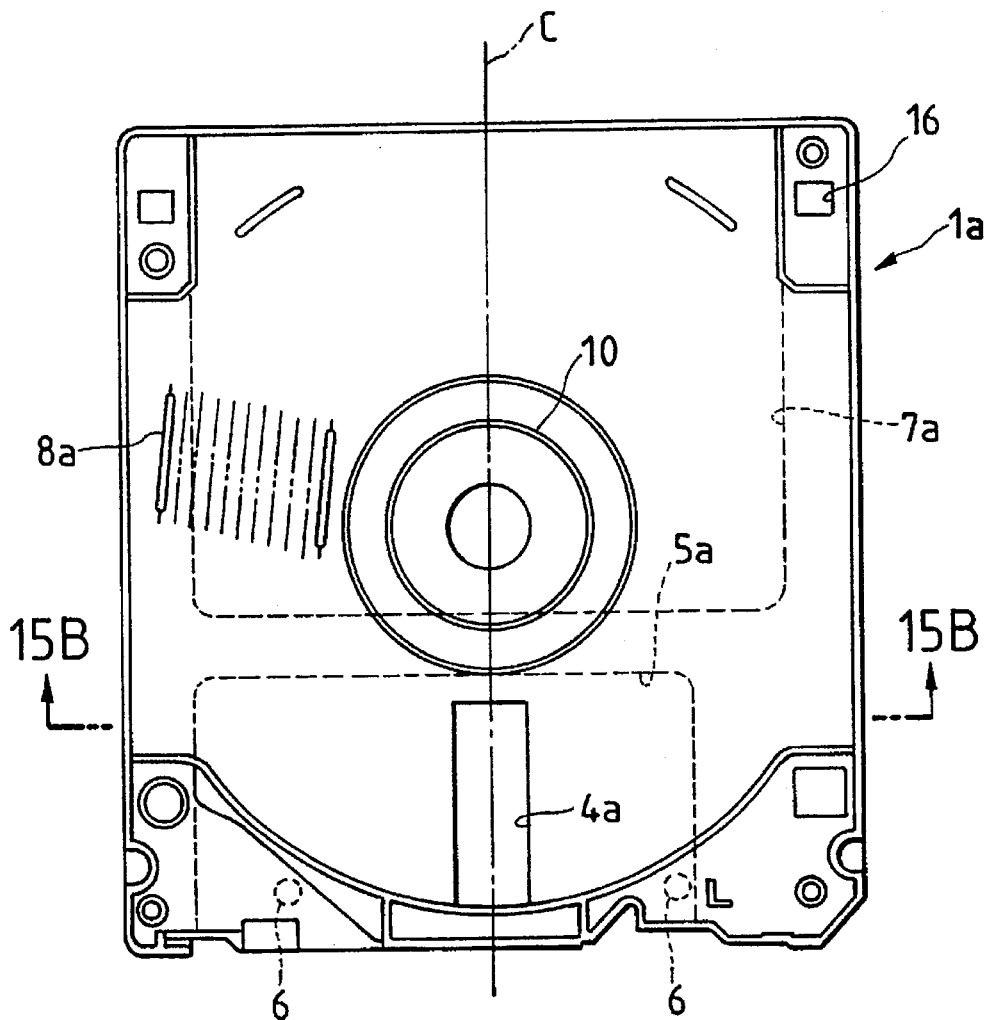
FIG. 15A is a plan view of an upper shell of the conventional disk cartridge when viewed from the inside thereof.
Figure 15B:
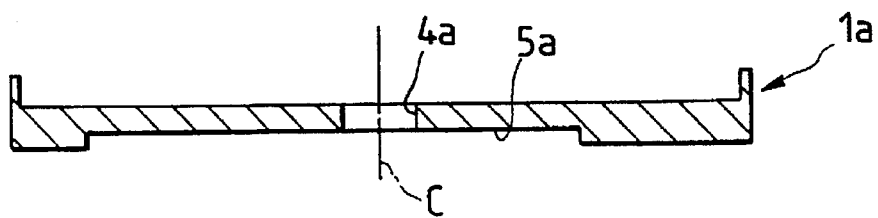
FIG. 15B is a sectional end view taken along the line 15B—15B in FIG. 15A.
Figure 16A:
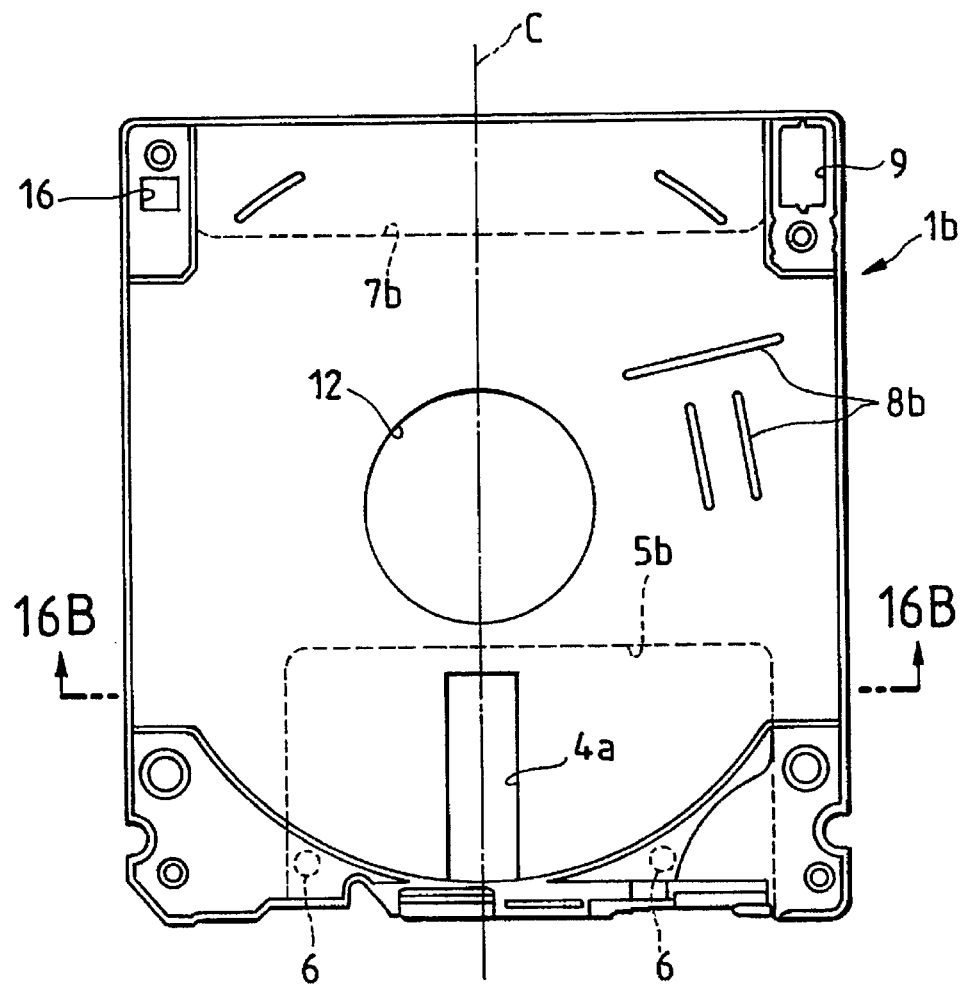
FIG. 16A is a plan view of a lower shell of the conventional disk cartridge when viewed from the inside thereof.
Figure 16B:
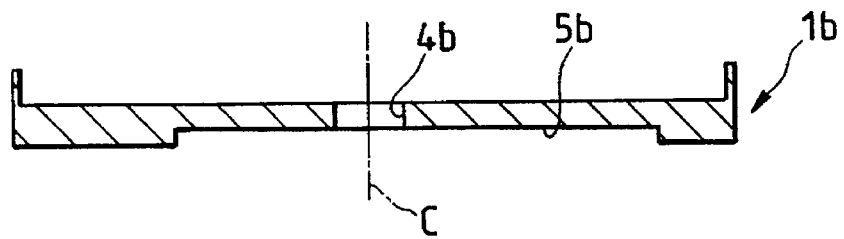
FIG. 16B is a sectional end view taken along the line 16B—16B in FIG. 16A.
Figure 17:
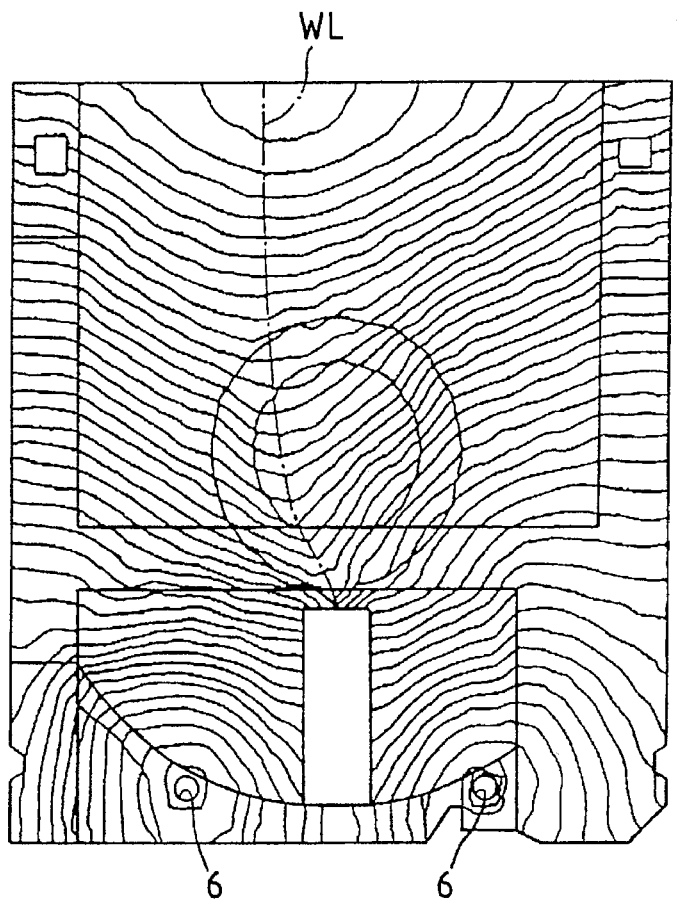
FIG. 17 shows a result of simulation of the flow of resin in the case where molten resin is injected into a cavity of molds through gates to form the conventional upper shell depicted in FIG. 15A.
Figure 18:
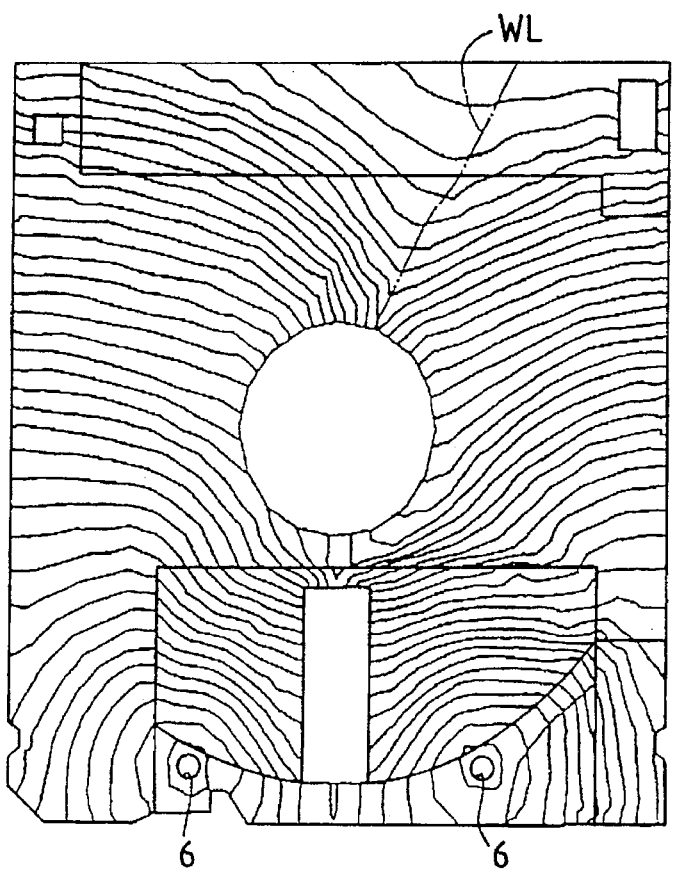
FIG. 18 shows a result of simulation of the flow of resin in the case where molten resin is injected into a cavity of molds through gates to form the conventional lower shell depicted in FIG. 16A.

FIG. 13A is a plan view of a lower shell according to a sixth embodiment when viewed from the inside thereof; FIG. 13B is a sectional end view taken along the line 13B—13B in FIG. 13A; and FIG. 13C is a sectional end view taken along the line 13C—13C in FIG. 13A.

The sixth embodiment is an embodiment which is most suitable for carrying out the present invention. According to the results of the aforementioned simulation, the eccentricity of the flow of resin in the upper shell is considerably smaller than the eccentricity of the flow of resin in the lower shell. Accordingly, only the symmetry of the thickness distribution in the lower shell is pursued.

In the sixth embodiment, a recess 26 is formed in the lower shell 1B so as to be disposed all over the inner surface of the lower shell except the inner surface of the recess 5b for limiting the range of sliding of the shutter, the vicinity of the center hole 12 and the inner surface of the recess 7b for sticking a label.

Because the shutter sliding recess 5b and the labeling recess 7b are U-shaped and thin, there is a possibility that the strength of the recesses may be lowered if the recesses are cut to be further thinner. Therefore, the recess is not formed in these regions. Incidentally, lightening of the lower shell is attained by thinning all regions except the aforementioned regions.

To prevent the magnetic disk from being damaged by the collision with the edge of the window 4b because of the vibration of the magnetic disk at the time of ultrasonic fusion of the upper and lower shells into one, the peripheral edge of the window 4b is formed so as to be oblique toward the inside. Further, ribs 27 (projecting stripes) arranged in parallel by twos in the left and right are formed in opposite sides of the window 4b. Such ribs 27 are formed in the corresponding positions of the upper shell. These ribs 27 are disposed so as to nip the rotating magnetic disk 2 from above and below, and serve to prevent dust or the like from coming in through the window 4b and to remove dust or the like deposited on the magnetic disk. It is preferable that the ribs 27 are disposed laterally symmetrically with respect to the center line C so that thicknesses in laterally symmetric positions are equal to each other.

Any upper and lower shells selected from the aforementioned embodiments can be combined suitably to form an FDC. Further, because the eccentricity of the flow of resin in the upper shell is relatively small, such a recess and such a projection may be formed only in the lower shell to attain the lateral symmetry of the thickness distribution.

In the aforementioned embodiments, there has been explained the case where two gates for injecting molten resin are provided in the shutter sliding recess. The present invention can be applied also to the case of a shell in which two gates are provided in the labeling recess and to the case of a shell in which four gates are provided in the two recesses.

The aforementioned upper and lower shells are produced by injection molding. The shapes of sunken portions or recesses of molds used in the injection molding are formed so as to be similar (substantially the same) to those of the shells shown in FIGS. 1, 2 and 5 to 13. Gates are provided in positions corresponding to the recesses 5a and 5b or the recesses 7a and 7b. The shells in the aforementioned embodiments are obtained by injection molding using such molds.

Obviously, numerous modifications and variations of the present invention are possible in light of the above teachings. It is therefore to be understood that the invention may be practiced otherwise than as specifically described herein.

What is claimed is:

1. A disk cartridge comprising:

upper and lower injection molded shells for rotatably storing a rotary recording medium, said upper and lower injection molded shells each including length, width and thickness dimensions;

shutter recesses formed in outer surfaces of said shells, said shutter recesses being asymmetric with respect to a center line extending along a center of the width dimension of said shells such that said shutter recesses are located more on one half of each of said upper and lower shells than in another half of each of said upper and lower shells with respect to said center line;

write/read windows formed in said shutter recesses;

a slidable shutter placed on said shutter recesses for opening and closing said write/read windows; and means for reducing an imbalance of a flow of resin caused by the asymmetry of the shutter recess during injection molding of at least one of said shells, said means for reducing an imbalance of a flow of resin comprising a projection in said one half of said at least one of said upper and lower shells which is located within a first surface area of said at least one of said upper and lower shells which is delimited by a surface area of said shutter recess, and a recess which is located at a second surface area of said at least one of said upper and lower shells which is adjacently outside the surface area of said shutter recess.

2. A disk cartridge according to claim 1, wherein said projection is formed in an inner surface of said shell.

3. A disk cartridge according to claim 1, wherein said projection is formed over an entirety of an inner surface of said shell corresponding to said shutter recess.

4. A disk cartridge according to claim 1, wherein said projection is formed in one of said shells in which a center hole for rotating said rotary recording medium is formed.

5. A disk cartridge according to claim 1, wherein said recess is formed in an inner surface of said shell.

6. A disk cartridge according to claim 1, wherein said recess is formed in one of said shells in which a center hole for rotating said rotary recording medium is formed.

7. A disc cartridge according to claim 1, wherein injection gates are provided symmetrically in said shutter recess with respect to said center line.

8. A disc cartridge according to claim 1, wherein injection gates are provided symmetrically in said shutter recess with respect to said center line.

9. A disk cartridge as recited in claim 1, wherein said means for reducing an imbalance of a flow of resin provides for a volume on the one half of said upper shell which is substantially equal to a volume of the another half of the upper shell at the shutter recess, and a volume on the one half of the lower shell which is substantially equal to a volume of the another half of the lower shell at the shutter recess.

10. A disk cartridge as recited in claim 1, wherein said means for reducing an imbalance of a flow of resin causes formation of a weld line which extends substantially along said center line.

11. A disk cartridge comprising:

upper and lower injection molded shells for rotatably storing a rotary recording medium, said upper and lower injection molded shells each including length, width and thickness dimensions;

shutter recesses formed in outer surfaces of said shells, said shutter recesses being asymmetric with respect to a center line extending along a center of the width dimension of said shells such that said shutter recesses are located more on one half of each of said upper and lower shells than in another half of each of said upper and lower shells with respect to said center line;

write/read windows formed in said shutter recesses;

a slidable shutter placed on said shutter recesses for opening and closing said write/read windows; and means for reducing an imbalance of a flow of resin caused by the asymmetry of the shutter recess during injection molding of at least one of said shells, said means for reducing an imbalance of a flow of resin comprising a projection and a recess, at least one of said projection or said recess being provided asymmetrically with respect to the center line so that the asymmetrically arranged shutter recess cooperates with the at least one asymmetrically arranged recess or projection to equalize a thickness of the disk cartridge at symmetrical positions with respect to the center line.

* * * * *